Jan. 31, 1967   A. CANDELISE   3,301,242
IGNITION TIMING DEVICE
Filed Aug. 13, 1964   2 Sheets-Sheet 1

INVENTOR.
Alfred Candelise
BY C. R. Meland
HIS ATTORNEY

INVENTOR.
Alfred Candelise
BY C. R. Meland
HIS ATTORNEY

United States Patent Office 3,301,242
Patented Jan. 31, 1967

3,301,242
IGNITION TIMING DEVICE
Alfred Candelise, Flint, Mich., assignor to General Motors Corporation, Detroit, Mich., a corporation of Delaware
Filed Aug. 13, 1964, Ser. No. 389,408
9 Claims. (Cl. 123—117)

This invention relates to ignition timing control devices for internal combustion engines and more particularly to an ignition timing control device which is capable of reducing the hydrocarbon emission from the exhaust gases of an internal combustion engine.

In the design of spark timing arrangements for motor vehicle internal combustion engines, it is a common practice to provide an advanced spark condition at idling to prevent engine overheating and water boiling during excessive idling periods, especially in hot weather. Athough this spark timing arrangement prevents the engine from overheating, it also allows an amount of unburned hydrocarbons to be emitted from the exhaust gas which can be reduced if the spark timing is retarded at idling and at slow speed conditions.

It accordingly is one of the objects of this invention to reduce unburned hydrocarbon emission by retarding the spark timing of the engine during the period when the engine is idling and where it is operating at very low speed driving conditions, for example, up to 20 m.p.h. road load.

Another object of this invention is to provide an ignition timing arrangement for an internal combustion engine where the ignition timing is retarded at idling or at slow speed conditions and wherein a temperature sensitive control means is provided for sensing the water jacket temperature and for advancing the timing to reduce heating of the engine during operation in hot weather.

Another object of this invention is to provide an ignition timing system for reducing unburned hydrocarbons emitted from the exhaust gas which is responsive to throttle position and which is capable of retarding the spark timing during an idling condition or during low speed operation.

Still another object of this invention is to provide a spark timing control arrangement wherein the spark timing is controlled by throttle position and by a temperature sensitive switch that senses water jacket temperature and modifies the spark timing as determined by the throttle control in accordance with water jacket temperature.

Further objects and advantages of the present invention will be apparent from the following description, reference being had to the accompanying drawings wherein preferred embodiments of the present invention are clearly shown.

Figure 1:
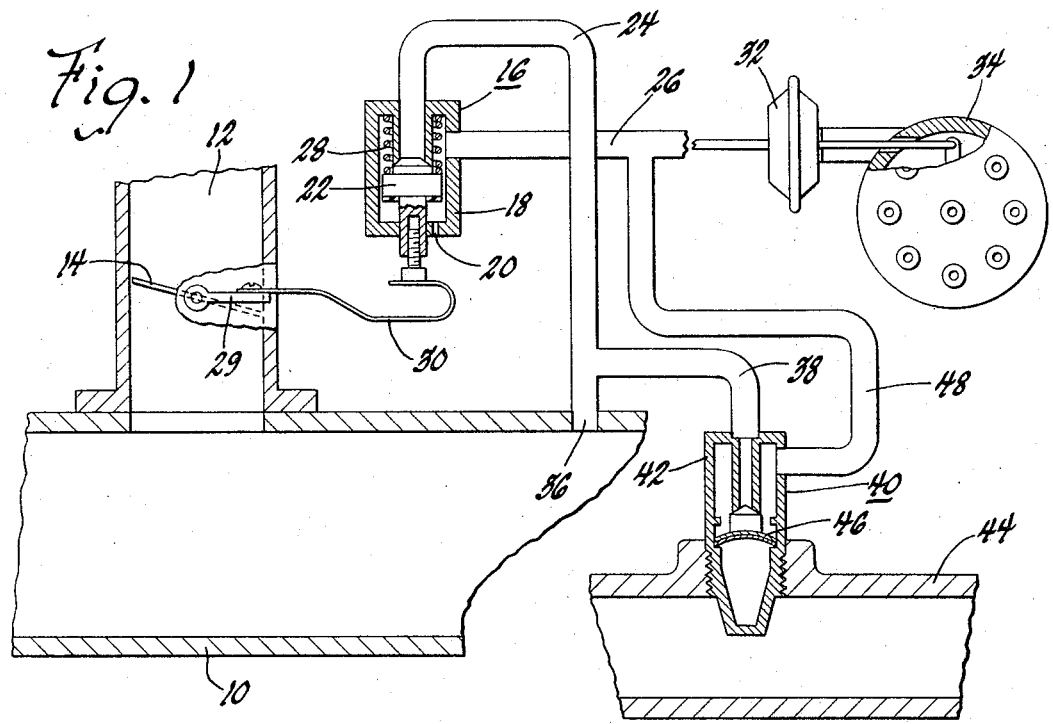
FIGURE 1 is a schematic illustration of an ignition timing control device made in accordance with this invention.

Referring now to the drawings and more particularly to FIGURE 1, a system is illustrated for controlling the spark timing of an engine which has a vacuum take off on the intake manifold side of the throttle. In FIGURE 1, the reference numeral 10 designates an intake manifold for an internal combustion engine which receives a combustible mixture of fuel and air through a passage 12. The passage 12 is controlled by a throttle valve 14 which is opened and closed by movement of an accelerator pedal as is well known to those skilled in the art.

The throttle 14 is mechanically coupled to a valve which is generally designated by reference numeral 16. The valve 16 has a housing 18 formed with an atmospheric vent passage 20. A plunger 22 reciprocates within housing 18 and can move to a position wherein it blocks flow through a pipe 24. The interior of housing 18 communicates with a pipe or conduit 26 and the valve plunger 22 is spring biased by spring 28 to a position where the end of conduit 24 and the passage 26 are in communication.

The valve plunger 22 and the throttle 14 are coupled together by an arm 29 and a leaf spring 30. The arrangement is such that when the throttle is opened, the plunger 22 is moved to a position where the vent 20 is blocked and the conduits 24 and 26 are in communication. When the throttle is in a substantially closed position, the plunger 22 engages the end of the pipe 24 to block communication between conduits 24 and 26 and the conduit 26 is then connected with atmosphere via the vent 20.

The conduit 26 is connected with the vacuum control unit 32 of an ignition distributor 34 which controls the spark timing of the engine. The control unit 32 and ignition distributor 34 are of conventional construction and can be of a type shown in the United States Patent 2,872,537 in the names of Hartzell, Redick, and Julian.

The conduit or pipe 24 is connected with the intake manifold of the engine at point 36. The pipe 24 is also connected with a cross pipe 38 which in turn is connected to a temperature sensitive control means generally designated by reference numeral 40. The temperature sensitive control means 40 includes a housing 42 which is threaded into the water jacket 44 of the internal combustion engine. The housing 42 contains a bimetal disk 46 which can control the connection of pipes 38 and 48. It is seen that the pipe or passage 48 is connected between the interior of housing 42 and the conduit 26.

The normal position of the bimetal disk 46 is illustrated in FIGURE 1 and normally blocks flow between the pipes 38 and 48. If the temperature of the coolant for the engine in water jacket 44 exceeds a predetermined safe value, the bimetal disk will deflect and cause the pipes 38 and 48 to be connected. It will be observed that under normal temperature conditions within the water jacket 44, the pipes 38 and 48 are not connected so that vacuum is not applied to the control unit 32 from pipe 38.

The operation of the system illustrated in FIGURE 1 will now be described. During regular idle operation of the engine, the throttle valve 14 will be in such a position that the valve plunger 22 blocks flow between pipes 24 and 26. The pipe 26 will therefore be connected with atmosphere via the vent 20 and assuming that the temperature of the coolant in water jacket 44 is below the predetermined safe value, the spark timing will be retarded since the fluid motor 32 is connected to atmosphere. If the engine is operated at its idle condition for a period of time that causes the temperature in the water jacket 44 to rise above a predetermined safe value, the bimetal disk 46 will deflect to connect the pipes 38 and 48. When this occurs, the vacuum of the intake manifold 10 is applied to the distributor control unit 32 to advance the spark and therefore reduce heating of the coolant in the water jacket 44.

During operation of the engine in a normal driving range, the throttle will be opened sufficiently to cause the valve plunger 22 to move to a position where the pipes 24 and 26 are connected. Since the engine during this condition of operation will not overheat, the bimetal disk 46 will be closed so that pipes 38 and 48 are not connected. It therefore is seen that while driving in a normal range of speed the vacuum control unit 32 will be connected with the intake manifold 10 of the engine and will operate in the conventional manner to advance the spark.

During a deceleration of the engine where the throttle moves towards a closed position, the pipe 24 will engage the plunger 22 of the valve 16 to disconnect the intake manifold from the vacuum unit 32 and to connect the same with atmosphere. During deceleration of the engine, there will be a retarding of the spark.

Figure 2:
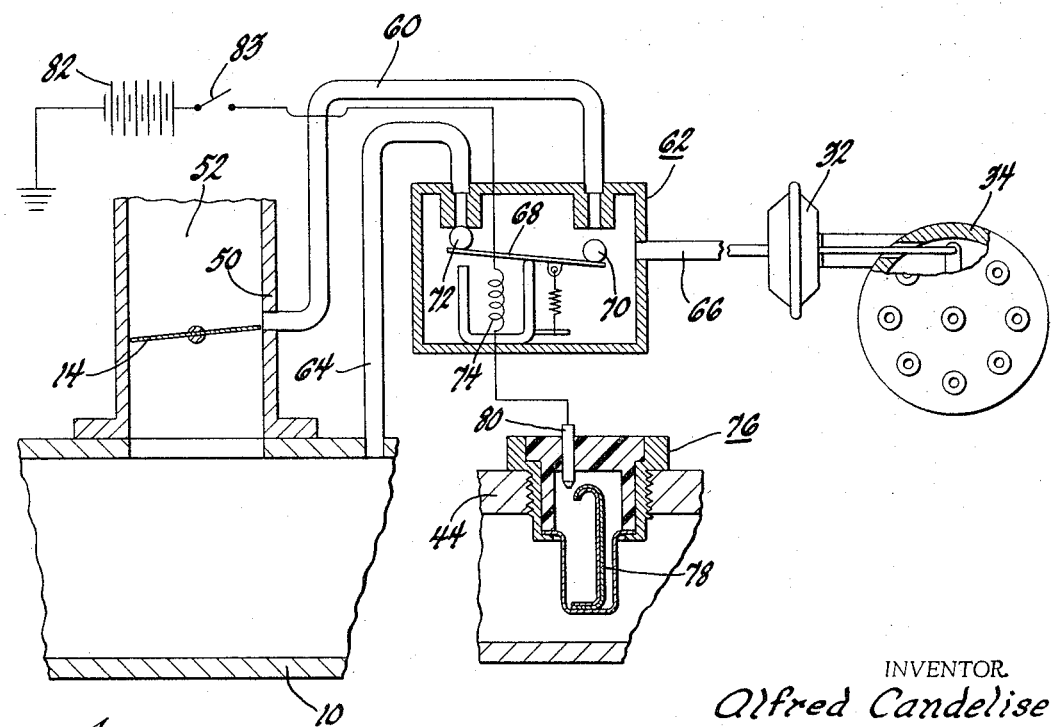
FIGURE 2 is a schematic illustration of a modified ignition timing control arrangement made in accordance with this invention.

Referring now to FIGURE 2, a spark timing control arrangement is illustrated for engines where the vacuum take off for the distributor is located at a point of the carburetor just outside the throttle plate rather than in the intake manifold of the engine. In FIGURE 2, the same reference numerals have been used to identify the same parts as were used in the embodiment of FIGURE 1.

Figure 3:
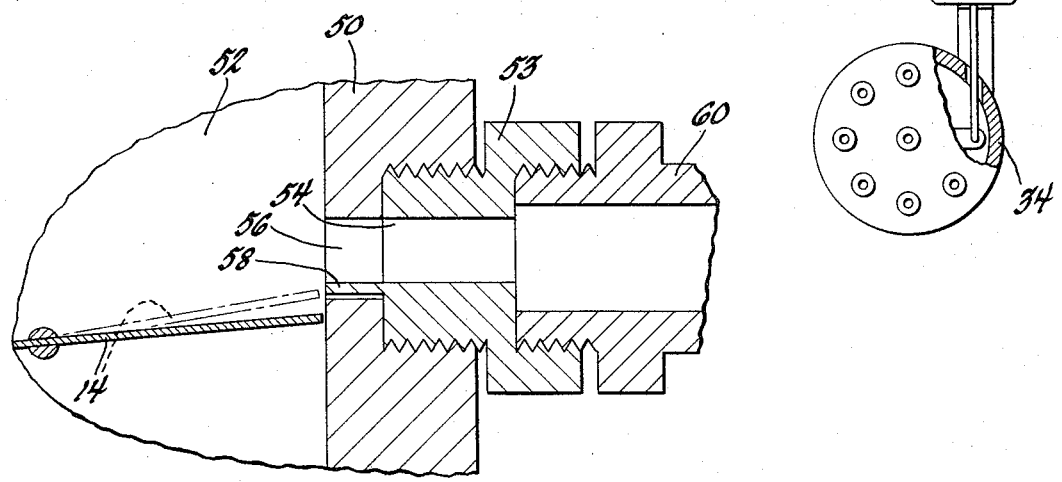
FIGURE 3 is an enlarged sectional view of a portion of the system illustrated in FIGURE 2.

In the FIGURE 2 arrangement, the opening and closing of the throttle valve 14 controls a port formed in the wall 50 of a carburetor intake passage 52. This port arrangement is shown in detail in FIGURE 3, and it is seen that the wall 50 of the carburetor intake passage is fitted with an adaptor 53. The adaptor 53 has a passage 54 which is aligned with passage 56 formed in the wall 50. The adaptor 53 has a section 58 which is of such a thickness as to provide a 5° travel for the throttle plate 14 before the throttle plate moves from a closed position to a position where it is ready to connect the passage 56 with the intake manifold side of the throttle plate 14.

The passages 54 and 56 are connected with a pipe or conduit 60 which is connected with an electrically operated control valve generally designated by reference numeral 62. A second pipe 64 connects the control valve 62 with the intake manifold of the engine. A third pipe or conduit 66 connects the control valve 62 with the vacuum control unit 32 of the distributor 34.

The control valve 62 includes a movable armature 68 having elements 70 and 72 which can move into blocking engagement with the ends of pipes 60 and 64. The armature 68 is spring biased to a position where pipe 64 is blocked by valve element 72. The control valve 62 includes a coil 74 and when the coil 74 is energized, the armature 68 will be moved to a position where pipe 60 is blocked and pipe 64 communicates with pipe 66.

The energization of the relay actuating coil 74 is controlled by a temperature sensitive switch 76 which is of conventional construction and which is threaded into the water jacket 44 of the engine. This switch includes a bimetal 78 and when the temperature of the coolant in the water jacket 44 is above a predetermined safe value, the bimetal 78 will move into engagement with the contact 80. The bimetal 78 is grounded and when this bimetal engages contact 80, the relay coil 74 will be energized from a source of direct current such as the battery 82 providing the switch 83 is closed.

The switch 76 can be of a type that is commonly found on passenger cars and is used to control the hot temperature signal light on a passenger car.

When the engine is operating at idle in the system of FIGURE 2 and the temperature within the water jacket 44 is at a normal value, the armature 68 will be in a position illustrated in FIGURE 2 so that the vacuum unit 32 is connected with pipe 60. The throttle valve 14 will now be below the section 58 of the adaptor 53 so that atmosphere is applied to the conduit 60 and therefore to the vacuum unit 32. This means that the spark timing of the engine will be retarded since atmosphere is being supplied to the vacuum control unit 32.

If the engine is permitted to idle for such a length of time in hot weather that the coolant within water jacket 44 rises above a predetermined value which corresponds to the boiling point of the coolant, the bimetal 78 will be moved into engagement with contact 80 to therefore cause the actuating coil 74 to be energized. This will cause the armature 68 to pivot closing pipe 60 and opening pipe 64 to pipe 66. The vacuum unit 32 will now be connected with the vacuum of the intake manifold 10 via pipe 64, the interior of control unit 62, and pipe 66. This means that the spark timing of the engine will be advanced to reduce heating of the engine.

During a normal driving range of speeds, the throttle valve 14 is positioned such that pipe 60 is connected with the intake manifold side of the throttle valve 14. This means that the vacuum unit 32 will respond to vacuum signals of the intake manifold via pipe 60, the interior of control unit 62 and pipe 66. During the normal driving range of speeds, the engine will not become overheated so that pipe 64 is blocked and pipe 60 is open to pipe 66.

Figure 4:
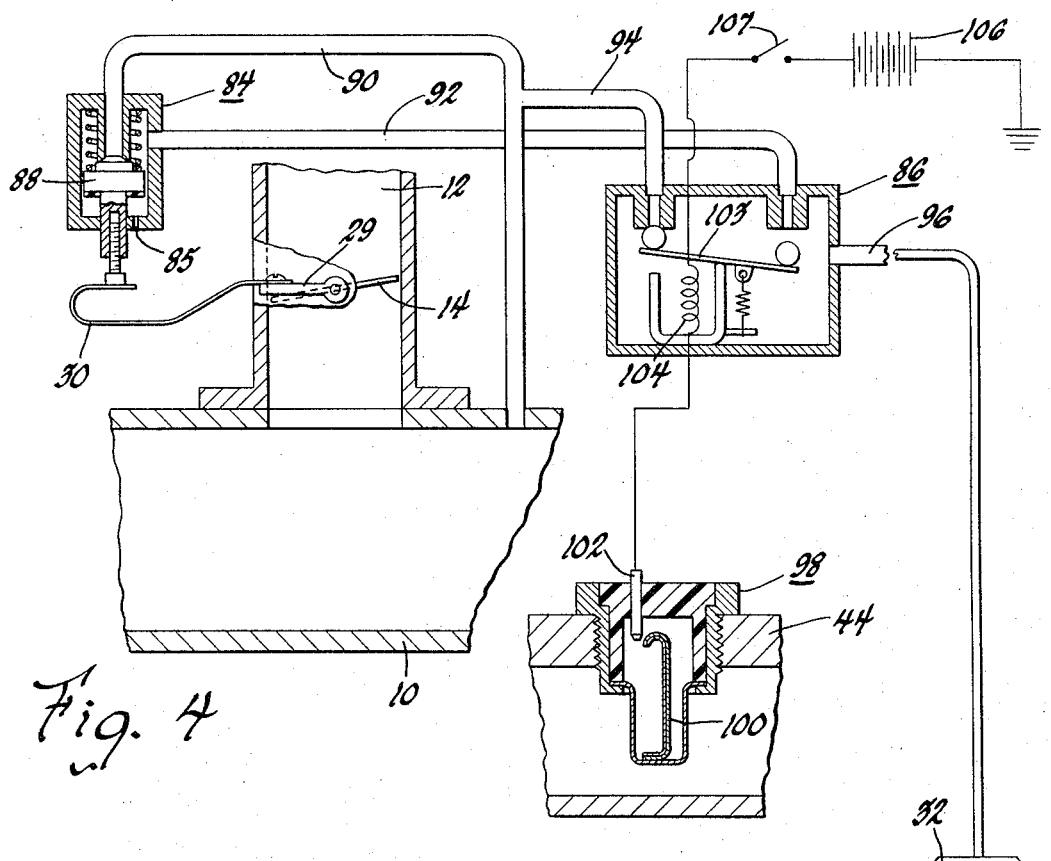
FIGURE 4 is a modified version of an ignition timing control system made in accordance with this invention.

Referring now to FIGURE 4, a spark timing control arrangement is illustrated that employs two valves, one of which is mechanically coupled to the throttle, and the other of which is controlled by a temperature switch that senses water jacket temperature.

In the FIGURE 4 arrangement, control valves 84 and 86 are used, the control valve 84 being of the same type as control valve 16 shown in FIGURE 1 and the control valve 86 being of the same type as the control valve 62 shown in FIGURE 2. The plunger 88 of the control valve 84 is mechanically coupled to the throttle valve 14. The control valve 84 is connected with a conduit or pipe 90 which is also connected with the intake manifold 10. A conduit or pipe 92 connects the control valve 84 and the control valve 86. A branch pipe 94 is connected between the pipe 90 and the control valve 86. The control valve 86 is connected with the vacuum control unit 32 by a pipe 96.

The system of FIGURE 4 has a control switch 98 which senses the temperature of the coolant in the water jacket 44. When the temperature of the coolant in water jacket 44 is at or just below the boiling point, the bimetal arm 100 engages the contact 102. The bimetal arm 100 is grounded and when it engages the fixed contact 102, a circuit is completed for the relay actuating coil 104 of the control valve 86 from the battery 106 and switch 107.

The operation of the system of FIGURE 4 will now be described. When the engine of the motor vehicle is idling, the throttle valve 14 will be in such a position that the piston plunger 88 blocks the conduit 90 and as a result, the conduit 92 will be at atmospheric pressure through the atmosphere vent 85. Assuming that the temperature of the coolant in the water jacket is below the boiling point, the bimetal 100 will not be in engagement with the fixed contact 102 and as a result, the armature 103 of the control valve 86 will be in the position shown in FIGURE 4 blocking conduit 94, but permitting flow through conduit 92. It therefore is seen that the vacuum control unit 32 will be at atmospheric pressure via conduit 96, the interior of control valve 86, conduit 92, through the interior of control valve 84 and then to atmosphere via the vent 85. With atmospheric pressure in the control unit 32, the spark timing of the engine will be retarded to reduce the emission of unburned hydrocarbons.

If the engine is operated in hot weather for a period of time with the spark timing retarded and with the engine idling, it is possible that the coolant within the water jacket 44 will reach the boiling point. When this happens, the bimetal contact 100 will engage the fixed contact 102 and the relay coil 104 will then be energized. This will cause the armature 103 to move to a position where conduit 92 is blocked and conduit 94 is open to the interior of the control valve 86. The spark timing of the engine will now be advanced, since the control unit 32 will be connected to the vacuum of the intake manifold 10 via conduit 96, the control valve 86, through conduit 94 and through conduit 90 to the intake manifold 10.

When the engine is operating at normal driving range speeds, the coolant in chamber 44 will remain below the boiling point if there is no trouble in the cooling system. The throttle valve 14 is now moved to a position where the piston valve 88 blocks and connects conduits 90 and 92. This means that the vacuum control unit 32 will be connected with the intake manifold of the engine via conduit 96, conduit 92, the interior of control valve 84, and through conduit 90 to the intake manifold 10. The spark timing of the engine will now be controlled in the usual conventional manner by intake manifold vacuum.

In all of the embodiments illustrated, the spark timing of the engine is retarded during the time that the engine is idling or when it is operating at a relatively slow speed to reduce emission of unburned hydrocarbons. This retarding of the spark is modified, however, in accordance with the temperature of the water jacket and when this temperature reaches the boiling point, the spark timing is automatically advanced to reduce heating of the engine.

It will be appreciated by those skilled in the art that the valves 16, 62, 84 and 86 could take a wide variety of forms as long as they are capable of responding to throttle position in the case of valves 16 and 84 and responding to water jacket temperature in the case of valves 62 and 86.

While the embodiments of the present invention as herein disclosed constitute a preferred form, it is to be understood that other forms might be adopted.

What is claimed is as follows:

1. An ignition timing control system for an internal combustion engine having a throttle which controls the amount of combustible mixture supplied to said engine comprising, a distributor, control means connected with said distributor for controlling the ignition timing of said engine in accordance with the position of said throttle, said control means causing retarding of ignition timing when said throttle is in engine idling position and advancing of ignition timing when said throttle is opened beyond engine idling position, said control means being connected with an engine temperature sensitive means, said temperature sensitive means causing advancing of ignition timing despite said throttle being in engine idling position when the temperature of said engine exceeds a predetermined value approaching the safe upper limit of normal operating temperatures.

2. A spark timing control arrangement for an internal combustion engine having a distributor and a cooling system comprising, a throttle valve for controlling the amount of combustible mixture supplied to said engine, control means connected with said distributor for advancing or retarding the spark timing, means connected with said control means for causing said spark timing to be retarded when said throttle valve is in a position to cause an idling of said engine, said last named means causing said spark timing to be advanced when said throttle valve is in a position to cause the engine to run in a normal driving range, and means responsive to the temperature of the coolant in said cooling system for causing said spark timing to be advanced when said throttle valve is in an idling position and when the temperature of said coolant is above a predetermined value approaching the safe upper limit of normal operating temperatures.

3. A spark timing control system for an internal combustion engine comprising, a distributor including a fluid motor for controlling the spark timing of said engine, an intake manifold for said engine, a throttle valve for controlling the amount of combustible mixture supplied to said intake manifold, a cooling system for said engine, said intake manifold having a port therein, first and second passages extending from said port to said fluid motor, first control valve means in said first passage operatively connected with said throttle valve, said control valve means being operative to open said first passage to connect said fluid motor with said intake manifold and provide advanced spark timing when said throttle valve is opened beyond an engine idling position, said control valve means being operative to connect said fluid pressure motor to atmosphere through a restricted bleed and to close said first passage to disconnect said fluid motor from said intake manifold and provide retarded spark timing when said throttle valve is in an engine idling position, and second control valve means in said second passage responsive to the temperature of the coolant in said engine cooling system and adapted to open said second passage to connect said fluid pressure motor with said intake manifold and provide advanced spark timing only when the cooling system temperature exceeds the normal operational range.

4. An ignition timing control system for an internal combustion engine comprising, a throttle valve for controlling the amount of combustible mixture supplied to said engine, a cooling system for said engine, a control means responsive to throttle position for causing the ignition timing of said engine to be advanced or retarded, said control means causing said ignition timing to be retarded when said throttle valve is in a position to cause an idling of said engine and causing said ignition timing to be advanced when said throttle valve is in a position to supply a greater amount of combustible mixture to said engine, and means responsive to temperatures of said coolant above safe operating temperatures for causing said ignition timing to be advanced regardless of the position of said throttle valve.

5. The ignition timing control system according to claim 4 where the means for sensing coolant temperature is a temperature sensing switch.

6. The ignition timing control system according to claim 4 where the means for sensing engine coolant is a valve including a thermostatic actuator.

7. An ignition timing control system for an internal combustion engine comprising, a distributor, an intake manifold for said engine, a throttle valve for controlling the amount of combustible mixture supplied to said intake manifold, a cooling system for said engine, a fluid motor connected with said distributor for advancing the ignition timing of said engine in response to a decrease in fluid pressure, an electrically operated control valve, said control valve being connected with said fluid pressure motor, with said intake manifold, and with a conduit that supplies combustible mixture to said engine through a pipe means, said pipe means having a port positioned adjacent said throttle valve whereby said pipe means is connected with the atmospheric side of said throttle valve when said throttle valve is in an idling position and is connected with the intake manifold side of said throttle valve when said throttle valve is moved to a position to provide increased speed for engine, means connecting said electrically operated control valve with a means for sensing the temperature of said engine coolant, said electrically operated control valve being operative to connect said pipe means with said fluid pressure motor when said engine coolant has a temperature below a predetermined value approaching the upper limit of normal operating temperatures and said throttle valve is in an idling position, said control valve connecting said fluid motor with said intake manifold when said throttle valve is in a position to provide increased speed for said engine, said control valve connecting said fluid motor with said intake manifold of said engine regardless of throttle position when the temperature of said engine coolant rises above normal operating temperatures.

8. In an internal combustion engine having an intake manifold and a cooling system, a throttle valve for controlling the amount of combustible mixture supplied to said intake manifold, a distributor for controlling the ignition timing of said engine, and a fluid pressure motor connected with said distributor and adapted to advance the ignition timing in response to a decrease in pressure, an ignition timing control system comprising a first control valve mechanically coupled with said throttle valve, a second electrically operated control valve, a first conduit connecting said first and second control valves, a second conduit connecting said first control valve with said intake manifold and with said second control valve, a third conduit connecting said second control valve with said fluid pressure motor, said second control valve having a relay coil, a temperature sensitive switch positioned to sense the temperature of the coolant in said cooling system controlling the energization of said relay coil, said second control valve connecting said first and third conduits when the temperature of said coolant is below a predetermined value approaching the upper limit of normal operating temperatures and connecting said second and third conduits when the temperature of said coolant is above normal operating temperatures, said first control valve connecting said first conduit with atmosphere when said throttle valve is in a position to provide engine idling and connecting said first and second conduits when said throttle valve is opened to a position to provide increased speed for said engine.

9. An ignition timing control system for an internal combustion engine comprising, an intake manifold for said engine, a cooling system for said engine, a throttle valve for controlling the amount of combustible mixture supplied to said intake manifold, a distributor for advancing and retarding the spark timing of said engine, a fluid motor connected with said distributor and adapted to advance the ignition timing in response to a decrease in pressure, an electrically operated control valve having first and second inlets and an outlet, means connecting said outlet with said fluid pressure motor, means connecting said first inlet with said intake manifold, means connecting said second inlet with atmosphere when said throttle valve is in a position to provide engine idling and with said intake manifold when said throttle valve is in a position to provde a higher speed for said engine, temperature sensitive means for sensing the temperature of the coolant in said cooling system controlling said electrically operated control valve, said control valve connecting said outlet with said second inlet when the temperature of said coolant is below a predetermined value approaching the upper limit of normal operating temperatures and being operable to connect said first inlet and said outlet when the temperature of said coolant is above normal operating temperatures.

References Cited by the Examiner

UNITED STATES PATENTS

| | | | |
|---|---|---|---|
| 2,131,413 | 9/1938 | Shepard | 123—117.1 |
| 2,274,316 | 2/1942 | Arthur | 123—117.1 |
| 2,471,111 | 5/1949 | Mallory | 123—117.1 |
| 2,809,620 | 10/1957 | Boylan | 123—117.1 |
| 2,876,754 | 3/1959 | Obermaier | 123—117 |

MARK NEWMAN, *Primary Examiner.*

LAWRENCE M. GOODRIDGE, *Examiner.*